H. J. MURRAY & W. S. RUGG.
GEAR SYNCHRONIZER.
APPLICATION FILED JUNE 11, 1917.

1,268,269.

Patented June 4, 1918.
2 SHEETS—SHEET 1.

Inventors
Howard J. Murray
By his Attorney Walter S. Rugg.
Messmer & Austin

H. J. MURRAY & W. S. RUGG.
GEAR SYNCHRONIZER.
APPLICATION FILED JUNE 11, 1917.

1,268,269.

Patented June 4, 1918.
2 SHEETS—SHEET 2.

Inventors
Howard J. Murray
Walter S. Rugg
By his Attorneys
Messmer and Austin

UNITED STATES PATENT OFFICE.

HOWARD J. MURRAY, OF BROOKLYN, NEW YORK, AND WALTER S. RUGG, OF PITTSBURGH, PENNSYLVANIA.

GEAR-SYNCHRONIZER.

1,268,269.   Specification of Letters Patent.   Patented June 4, 1918.

Application filed June 11, 1917. Serial No. 174,009.

*To all whom it may concern:*

Be it known that we, HOWARD J. MURRAY, a citizen of the United States, and a resident of Brooklyn, county of Kings, State of New York, and WALTER S. RUGG, a citizen of the United States, and resident of Pittsburgh, county of Allegheny, and State of Pennsylvania, have invented certain new and useful Improvements in Gear-Synchronizers, of which the following is a specification.

The invention relates in general to a variable speed power transmission mechanism of the shift gear type, in which the motor driven gear and the load carrying gear are coördinated to assume a speed of rotation approximately equal to each other before they are moved into meshed position, and particularly relates to an improvement in the means for affecting this coördination or synchronization of the gears.

Where such devices are designed to be used in high speed work, especially where there are rapidly succeeding variations in the load factor, as in automobile driving, it is obvious that connections and disconnections must be made almost instantaneously in order to eliminate, as far as possible, the wear and tear upon the flexible clutch elements usually employed in devices of this character. The engaging and disengaging of clutch elements which have usually been of the friction clutch type heretofore known, has been effective by a manual control. This introduces the factor of personal equation so that there was necessarily an indefinite timing of the clutch disconnection relative to the meshing of the gear combination resulting not only on wear of the friction element, but also rendering it a matter of indefiniteness as to whether the gear ratios had approached the desired condition to effect an easy meshing of the gear without shock.

Accordingly, one of the objects of this invention is to provide an improved means for synchronizing the driven and driving gears before they are moved into meshed relation and for automatically disconnecting said means when the gears have reached that predetermined and set condition in which the meshing is most effectively attained.

We attain this object by causing the movable element of the shifting clutch mechanism, which couples the driving with the driven gears, to be placed under an actuating tension through the agency of the gear shifting mechanism and by releasing the tension thereon automatically just before the power gears come into meshing engagement.

In the following disclosure two classes of instrumentalities for effecting this automatic releasing of the shifting clutch elements will be disclosed. One of these classes will include two different types of electrical clutch control mechanisms, Figures 1 and 6, and the other class will be illustrated by a delayed cam releasing mechanism, Fig. 2.

In general the devices include a control rod for shifting the power gears, the initial movement of which will move shifting clutch elements, into operative driving engagement to synchronize the power gears about to be meshed, the final gear meshing movement of which rod will cause the shifting clutch to become inoperative.

Various other objects and advantages of the invention will be in part obvious from an inspection of the accompanying drawings and in part will be more fully set forth in the following particular description of one form of mechanism embodying our invention, and the invention also consists in certain new and novel features of construction and combination of parts hereinafter set forth and claimed.

Referring to the accompanying drawings:

Fig. 2 is a similar view illustrating a mechanical type of clutch breaking mechanism and showing some of the parts of Fig. 1 in outline;

Figs. 3, 4 and 5 are enlarged details of certain features shown in Fig. 2; Fig. 3 showing the friction clutch control with the power gears in meshed position and Figs. 4 and 5 showing the control with the power gears in neutral unmeshed position;

The invention is herein described in connection with a variable speed transmission of the conventional slide gear type, which has been selected to illustrate the adaptability of the invention to an organization involving numerous gears, but it is obvious that the invention may be applied to any situation in which gears are to be moved to and from a meshed position.

In the drawings there is shown a containing casing 10 for housing the several parts and for providing bearings for the several shafts and shift rods entering therein. Further, for the purpose of showing the applicability of this invention to an automobile engine construction, it will be considered that the shaft 11 is a power shaft operatively connected through the clutch 12, with the engine shaft of an automobile and that the shaft 13 is a propeller shaft operatively connected to drive the traction wheels of the automobile.

The propeller shaft projects into the casing in alinement with the power shaft and has certain portions thereof squared to accommodate the clutch elements, hereinafter described. A counter-shaft 14 provided with a main drive gear 15 adjacent one end is rotatably mounted within the casing and parallels the incased portion 16 of the propeller shaft. The gear 15 is constantly in mesh with a main drive gear 17 fixed to the power shaft 11, so that the counter shaft is constantly connected to be driven from the power shaft. Clutch elements 18 and 19, in the claims referred to as gears, the former fixed to the side of the gear 17 and the latter slidably mounted on a squared portion 16 of the propeller shaft, are arranged to provide a direct drive between the shafts 11 and 16. Fixed to the element 19 is the gear 20 adapted, when meshed with a gear 21 fixed on the countershaft, to obtain second speed. Another gear 22 slidably mounted upon the square portion 16 of the propeller shaft is designed in one shifted position to mesh with a gear 23 on the counter-shaft to obtain first speed and in another shifted position to mesh with an intermediary gear 24 and a gear 25 on the counter-shaft to obtain reverse speed. A longitudinally shiftable control rod 26 is connected by means of a laterally extending arm 27 and clutch collar 28 to slide the unit forming the clutch element 19 and gear 20 to and from their respective operative positions to obtain direct and second speed. A corresponding rod 29 is similarly connected to the sliding gear 22 so as to move the same into mesh with gear 23 to obtain first speed or into engagement with gear 24 to obtain reverse speed.

As this construction is all conventional and well known, it is to be assumed that the diagrammatic showing in the drawing is intended to illustrate any of the perfected power transmission of this kind now in general use.

The features hereinafter described may be considered as an assembled unit constituting an accessory adapted to be attached to the conventional parts hereinbefore described.

Mounted upon the portion 16 of the propeller shaft and upon the counter-shaft or upon what may be regarded as an extension of these shafts is a miniature pinion gear set in general corresponding to the power gear set except that the corresponding gears of the miniature set are continually in mesh. Tracing out the arrangement of one set of these synchronizing small gears or pinions, it is noted that one pair includes pinions 30 fixed to the countershaft and meshing with gear 31 loose upon a circular portion 32 of the propeller shaft. The gear ratio is so designed that when the gear 31 is clutched to the propeller shaft by means hereinafter described, approximately the direct or high drive condition will be provided between the countershaft and the propeller shaft before the corresponding clutch elements 18 and 19 are meshed. Preferably, the ratio of the gears 30 and 31 is slightly greater or less than the gear ratio of the clutch elements 18 and 19 so that just before they are meshed, the teeth of the elements will slowly pass each other. However, as the meshing action is almost instantaneous and there will be little, if any, deceleration of the elements after they are freed of the friction clutch drive, the gear ratios will be about the same and varied merely to obtain the best meshing action under the different speed conditions of the driving or driven members. Similarly pinions 33 and 34 will provide second speed conditions; pinions 35 and 36 will secure first speed conditions and pinions 37 and 38 and 39 will obtain reverse speed conditions.

A slidable clutch element 40 is mounted upon a square portion of the shaft 16 and has a slight shifting movement between the gears 31 and 34 and is so designed to provide a driving connection between the shaft 16 and whichever of the gears 31 or 34 it is in driving engagement therewith. The clutch element 40 includes a clutch collar 41 provided with a peripheral groove for containing a ring portion 42 of a projecting clutch arm 43 which is held against rotary movement by means of a laterally extending pin 44 slidably mounted in a bearing 45 provided by some stationary part of the casing.

A similar slidable clutch element 46 is disposed between the gears 36 and 39 so as to selectively connect either one of these gears with the shaft 16.

The clutch element 40 is connected to the shift rod 26 by means of a clutch 47 carried on an extension 48 from the end of the shift rod 26 which extension constitutes a plunger piston. The clutch 47 includes a plunger 49 designed to engage in a slot 50 at the upper end of the clutch arm 43. The clutch is controlled by an electromagnet 51 of the plunger type, the plunger of which constitutes the clutch plunger 49. The electromagnet is carried by the extension 48, the free end of which is formed into encircling straps 52 for demountably holding the electromagnet in position. In one form of the invention, a resilient connection is provided between the shift arm 26 and the clutch element 40 and for which purpose the extension is formed into a rod 53 fixed to the arm 26 and provided with a stop collar 54 slidably contained within a spring cylinder casing 55 constituting a carriage for the clutch element and its controlling electromagnet. A pair of centering springs 56 and 57 are mounted within the casing 55 and act normally to center the casing relative to the stop collar 54. A similar electromagnetically controlled clutch 58 is mounted upon the extension from the control arm 29 so as to control the clutching engagement with the clutch element 46. These parts are so proportioned that normally the clutches 47 are disconnected from their correlated slots 50 but their plungers 47 are positioned in alinement with the slots as shown by the clutch 58 in Fig. 1. The device as thus described constitutes a complete operative construction in which the control members 26 and 29 may be actuated manually or through any of the conventional gear shifting devices now known. In its more perfected installation, however, it is proposed to utilize this device in connection with an automatic gear-shifting mechanism, such as is disclosed in our co-pending application, Serial No. 2951 filed January 18, 1915.

Figure 6:
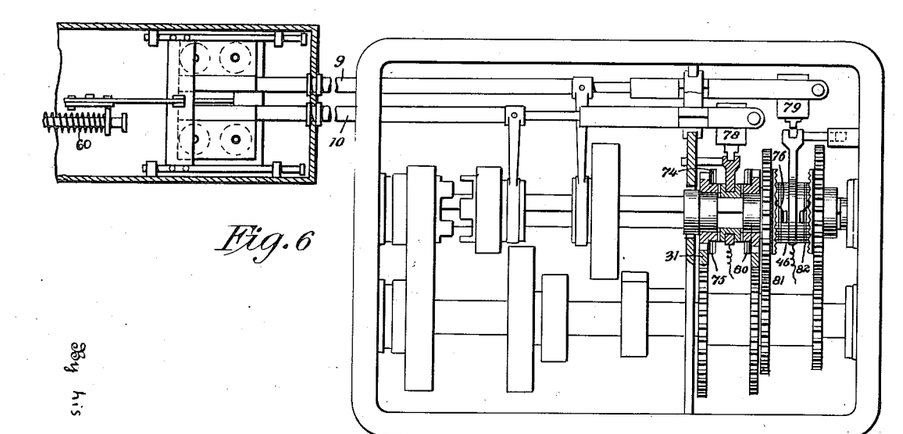
Fig. 6 is a view similar to Fig. 2 showing another form of the electric clutch breaking type.

The spring tensioning device of such an automatic shifting mechanism is shown diagrammatically at 60 of Fig. 6, so as to facilitate the description of one preferred mode of operation of the device herein disclosed. It is understood that the gear shift rod 26 is moved to the left to make a driving connection of the driving and driven parts at direct speed and is moved to the right to attain second speed. Shift rod 29 is similarly moved to the left to attain first speed and moved to the right to obtain a reverse speed of the parts. This shifting is preferably affected selectively by means of a control lever suitably disposed convenient to the operator and arranged for acting to inaugurate the action of these control rods through electrical agencies. In addition to its function of controlling the shifting of the control rods, this same control lever indicated diagrammatically at 62 (Fig. 8) may be connected with a source 63 of electric energy for energizing the electromagnets 51 and 58 and so arranged that moving the lever onto contact buttons 64 or 65 will close the circuit through electromagnets 51 or 52 respectively. To effect this arrangement a conductor 66 leads from one side of the source of electric energy and is bifurcated to lead to one side of each of the electromagnets 51 and 52. The opposite side of the electromagnet 51 is connected by means of a conductor 67 to the contact 64 and a conductor 68 similarly connects the electromagnet 52 with the contact 65. A conductor 69 leads from the lever 62 to the opposite side of the source of electric energy.

The circuit which includes the conductor 67 contains a circuit closer 70, the movable element 71 of which is mounted on the shift rod 26 and so arranged that the circuit is completed through the conductor 67 when the shift rod is in its normal position with the gears controlled thereby in neutral unmeshed position. The circuit which includes the conductor 68 contains a similar circuit closer 72, the movable element 73 of which is mounted on the rod 29. These movable elements of the circuit closers are so disposed on their respective control rods that the circuit is completed therethrough when the lever is moved into engagement with the contacts 64 or 65 to energize their corresponding electromagnets. The parts of the circuit closers are so proportioned that the closed circuit therethrough is maintained during the shifting of the friction clutch element and is broken just before or at the instant that the power gears are moved into meshing engagement.

Figure 1:
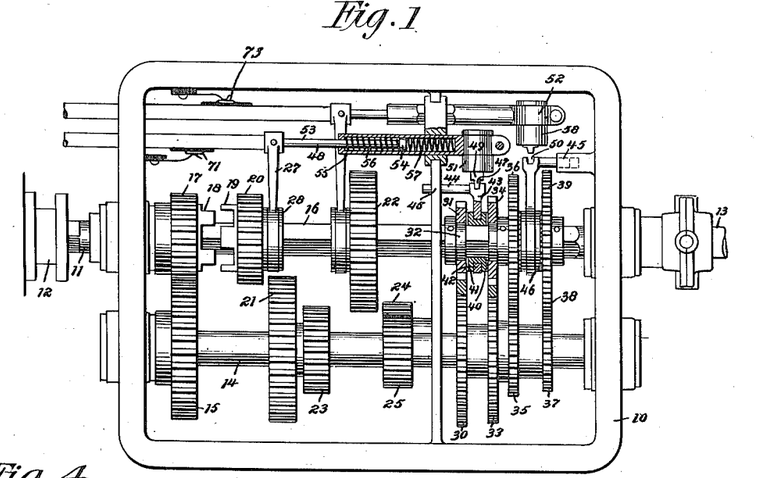
Fig. 1 is a plan view of a preferred embodiment of our invention, illustrating an electric type of clutch breaking mechanism.
Figure 7:
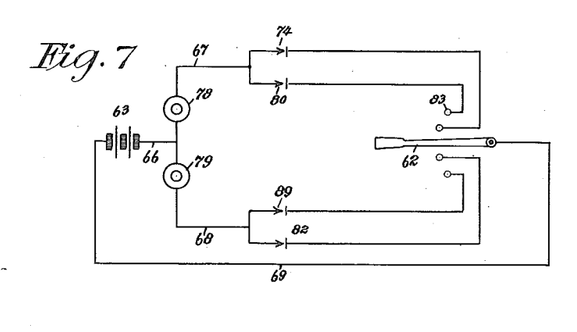
Fig. 7 is a diagrammatic view showing one form of an electric circuit utilized in connection with the device shown in Fig. 6.
Figure 8:
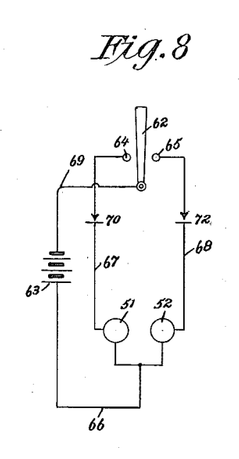
Fig. 8 is a similar view of a circuit utilized in connection with the form of the invention shown in Fig. 1.

The modified form illustrated in Figs. 6 and 7 correspond to the form shown in Figs. 1 and 8, except in the feature of electrical control for causing the friction clutch to become inactive at the time the power gears are about to become meshed. In this modified form the relatively fixed element of the friction clutch has fixed to one side thereof a contact maker which includes a circular rack 74 insulated from the gear 31 by means of an insulation 75. The rack is engaged by a contact spring 76 carried by the shiftable clutch collar 40 and insulated therefrom by a support 77. With this form of connection the electromagnets 78 and 79 controlled thereby are of the high impedance type so arranged that when the relative speed between the clutch element and gear 31 approached zero, the clutch controlled by the electromagnet will be automatically withdrawn from its engagement with the clutch element 40.

A similar contact maker 80 is positioned at the opposite face of the shiftable element 40 and similar contact makers 81 and 82 are positioned on opposite sides of the shiftable clutch element 46. The electric circuit shown in Fig. 7 is similar to that shown in Fig. 8, except that each of the conductors 67 and 68 are bifurcated with the branches leading to control contacts 83, corresponding to the contacts 64 and 65. Each of the bifurcated branches of the conductors 67 and 68 is provided with one of the contact makers 74, 80, 81 and 82.

Figures 2, 3, 4, 5:
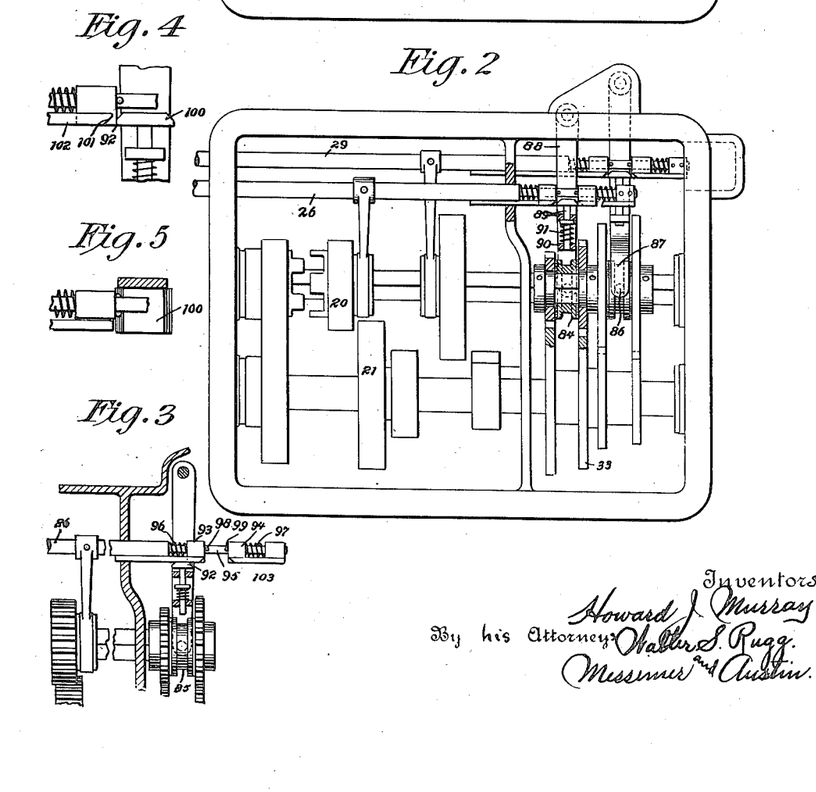

Referring to the modified form of the clutch release illustrated in Figs. 2 and 5 inclusive, it is noted that the automatic disengagement of the slidable friction-clutch-element from its coacting gear-carrying-friction-clutch-element is attained by mechanical means in distinction from the electrical means hereinbefore described. In this form of the invention a spring controlled cam arrangement is substituted for the electrical means which include the electromagnets 47 and 58 together with their correlated circuit breakers 71 and 73.

A sliding clutch element 84, corresponding to the similar clutch element 40 of Fig. 1, is provided with a peripheral slot 85 in which is positioned pins 86 projecting inwardly from the yoke end 87 of a swinging pendulum arm 88 pivoted so as to swing in the direction of movement of the clutch element. The pendulum arm supports a plunger 89 carried in guiding bracket 90 in turn fixed to the arm 88. The plunger 89 is normally maintained in projected position by means of a spring 91. The pendulum arm is so coupled to the control rod 26 that the initial movement of this rod in either direction causes the arm to move with the rod and thus carry the element 84 into frictional engagement with its coacting clutch surface.

For this purpose the plunger is provided with a head 92 disposed between and positioned in the path of movement of a pair of actuators in the form of blocks 93 and 94 slidably mounted upon a rod 95 constituting an extension from the control rod 26. These actuators are normally pressed toward each other by means of springs 96 and 97 and are held in spaced apart position by stop pins 98 and 99 so that the head 92 may normally fit in between the actuators. For the purpose of moving the plunger into an inoperative position and thus release the lateral pushing effect of the actuators 93 or 94 on the arm and clutch element, the head 92 is provided with a beveled side face 100 which is adapted to be engaged by the beveled end 101, of either of a pair of shifting cams 102 and 103. These shifting cams are fixed to the rod 95 on opposite sides of the normal position of the head 92 as shown in Figs. 2 and 4, and with their beveled ends 101 approximately in line with their correlated pins 98 or 99 as shown more particularly in Fig. 3.

In operation and assuming that the engine shaft is turning with the gears shifted, the clutch "in" and that the operator desires to change to another speed, the control lever is shifted, thus effecting the neutralization of the gears as is usual with automatic gear shifting devices. In this position the device disclosed in Fig. 1 will be in the neutral position shown in this figure, except that the plunger 47 of electromagnet 51 is in the inoperative position shown in connection with electromagnet 58. Let it be assumed that it is desired to shift the power gear so as to obtain a direct drive. In this case the control rod 26 is moved to the left with a tension depending upon the tension of the force represented by the spring 60 controlling this movement in the electrical gear shift device. This action will cause the collar 54 to bear on the spring 56 placing the spring under tension and acting through the spring and extension 48 to cause the clutch 47 to move the frictional clutch element 40 to the left and into operative engagement with gear 31 to connect the propeller shaft frictionally with the counter-shaft through the gear train 31, 30. The gear 31 will act as a stop to limit the movement of the movable element of the friction clutch but the control rod 26 is free to move beyond this position, due to the resilient connection provided by the spring 56. This further movement causes the clutch elements 18 and 19 to be moved into meshed position. In making this further movement, however, the member 71 is moved away from its coacting circuit closing element and the circuit through the electromagnet 47 is intercepted. This deenergizing of the electromagnet permits the clutch element 47 controlled thereby to be withdrawn out of the groove 50 thus rendering the friction clutch inoperative and disconnecting the propeller shaft from its engagement with the counter-shaft. As the control shift rod 26 is no longer held or resisted from further movement by the gear 31, this rod is free to move to the left under the suddenly released power of the spring 61 thus causing the power elements 18 and 19 to move into their meshed positions. Similarly the other gears are synchronized and shifted to obtain the desired first, second or reverse speeds.

The modified form illustrated in Figs. 6 and 7 is operated in a manner similar to the operation of the device described for Figs. 1 and 8, in so far as the actuation of similar parts are concerned. By a movement of the switch lever 62 contact is made with whichever of the buttons 83 controls the desired combination of gears which are to be shifted. This setting of the lever acts as previously suggested to cause the control rod 26 or 29 to shift and at the same time acts to complete the electric circuit through the electromagnet 78 or 79 and through its correlated contact maker 74, 80, 81 or 82 as will be apparent from following the diagram shown in Fig. 7. As long as there is a material relative movement between the friction clutch elements, the spring 76 will wipe across the correlated rack in circuit with a magnet of high impedance and when a high rate of contact making exists it will be imposible for sufficient current to flow to enable it to pull the plunger 47 out of engagement with its slot 50. As the two clutch elements in engagement approach their relatively fixed position more and more current will flow through the electromagnet until it possesses sufficient strength to withdraw the plunger, thus freeing the shiftable member of the frictional clutch from its engagement with its correlated shift rod.

Referring to the modification shown in Figs. 2 to 5 inclusive, and assuming that it is desired for instance, to shift the power gears from neutral position into a position to attain second speed conditions, the lever is moved into engagement with the proper contact to control the gear shift (not shown). In this case the shift rod 26 will be moved to the right as heretofore described, which movement will cause the left actuator 102 to move into engagement with the adjacent side of the plunger head 92 swinging the arm 88 to the right and causing the pins 86 to swing the clutch member 84 to the right and into frictional engagement with the gear wheel 34. The actuator 102 will be maintained in pressing engagement against the head 92 by the tension of the spring 96 controlling the same. A continued movement of the rod 26 will cause the cam end 101 of the actuator 102 to engage the cam surface 100 of the head 92 causing the head to be depressed out of the path of movement of the actuator 102 and to assume the inoperative position shown in Fig. 3. By this means it will be obvious that the plunger head 92 will be removed from the path of the member 102 thus permitting a free movement of the control rod 26 so as to bring the gears 20 and 21 into meshing engagement as hereinbefore described.

The restoration of the actuator rod 26 to its normal position will restore the parts to the positions shown in Fig. 2. It is obvious from the disclosure in Fig. 2 that the arrangement of clutch elements as described in detail for the left hand set of the miniature gear combinations applies to the right hand set illustrated in connection with the control rod 29 and the movement for attaining direct, first and reverse speed is the same as that described for attaining second speed.

It may be considered that in all of these forms, the control rods 26 and 29 have three phases of movement when shifted in one direction. The first part of the movement shifts the friction clutch into active connection, the second phase of movement places the springs 56, 57 or 96, 97 under tension and the final phase, larger under the action of the released tension of the springs 56 and 57, snaps the power gears into meshing position.

It is obvious that by means of a device of this character a nicety of adjustment can be provided which is so arranged that the power gears may be moved into intermeshing relation without shock, noise or injury to any of the parts. As the actuation of the releasing means is independent of human efforts, the time interval between the releasing of the friction clutch and the meshing of the power gears can be made definite and a standard shifting action secured. The whole operation is automatic and a different actuation of the parts will follow in proper sequential order to obtain the most perfect meshing condition of the high speed power gears, all of which operations will follow the initial inaugurating movement of the control mechanism. Especially when used in connection with an electric gear shifting device the actuation of the device is extremely simple and safe. It is merely necessary to shift a control lever into contact with the proper contact button.

While we have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

What we claim is—

1. In a device of the class described, the combination of two gear sets each having approximately the same speed ratio, one set including a driving member and a member adapted to mesh therewith to constitute a driven member, means including the other gear set for causing the two members to approach the same rotary speed before they are meshed and means coactively associated with the driving and driven member for moving said last named means into an inoperative position when said driving and driven members have been moved by said last named means into a preset relative position.

2. In a device of the class described, the combination of a driving and a driven element, means for moving the same into interengaging position, means for causing the speed of rotation of one element to approach that of the other as they are moved into inter-engaging position and means controlled by the approach of the elements into their inter-engaging position for automatically causing said last named means to become inoperative.

3. In a device of the class described, the combination with a pair of gears adapted to be shifted into a driving engagement, and a control means for varying the relative position of said gears, of means for causing one of the gears to approach the speed of the other gear, said means including a friction clutch, a connection between the movable element of the clutch and said control means whereby the control means moves the clutch elements into driving engagement, said connection including means for breaking the engagement between the control means and the clutch element, said last named means being operable independently of the engagement of the control means with the shiftable gear.

4. In a device of the class described, the combination with a pair of gears, one of which is adapted to be shifted into a driving engagement with the other and control means for effecting said shift, of means for causing one of the gears to revolve at a speed approximately that of the speed of the other gear before they are finally in driving engagement, said means including a friction clutch operatively connected to said control means to be moved into operative condition with the initial movement of said control means and means for automatically disconnecting said friction clutch from the control means as the revolving gears approach a relatively fixed condition.

5. In a device of the class described, the combination of a pair of gears one of which is adapted to be shifted into a driving engagement with the other gear, speed means for causing one of the gears to revolve at a speed approximately that of the speed of the other gear, a control means for moving said speed means into operative position and for shifting said shiftable gear, resilient means for placing said control means under tension, and mechanism for releasing the engagement of said control means with said speed means, and for permitting said tensioned control means to move said shiftable gear into driving engagement with said other gear.

6. In a device of the class described, the combination of a pair of gears, one of which is adapted to be shifted into a driving engagement with the other gear, speed means for causing one of the gears to revolve at a speed approximately that of the speed of the other gear, a control means for moving said speed means into operative position and for shifting said shiftable gear, resilient means for placing said control means under tension, and mechanism actuated by an increase of tension on said control means for releasing the engagement of said control means with said speed means, and for permitting said tensioned control means to move said shiftable gear into driving engagement with said other gear.

7. In a device of the class described, the combination of a driving and a driven element, means for moving the same into inter-engaging position, means for causing the speed of rotation of one element to approach that of the other, as they are moved into inter-engaging position, and electrically actuated means controlled by the approach of the elements into their inter-engaging position for automatically causing said last named means to become inoperative.

8. In a device of the class described, the combination of a driving and a driven element, means for moving the same into inter-engaging position, means for causing the speed of rotation of one element to approach that of the other, as they are moved into inter-engaging position, and electro-magnetically actuated means controlled by the approach of the elements into their inter-engaging position for automatically causing said last named means to become inoperative.

9. In a device of the class described, the combination of a pair of gears permanently in mesh, an element of a friction clutch operatively connected to one of said gears to revolve therewith, a coacting clutch element adapted to be moved into engagement with the gear-connected-clutch-element to revolve therewith, a power member connected to said coacting clutch element, a shiftable control means and a clutch for connecting said control means and shiftable friction clutch element whereby a connection is made at will between the train of meshed gears and the power member, and electrical means operable at a present speed of the gear train for intercepting said connection.

10. In a device of the class described, the combination of a pair of gears permanently in mesh, an element of a friction clutch operatively connected to one of said gears to revolve therewith, a coacting clutch element adapted to be moved into engagement with the gear-connected-clutch-element to revolve therewith, a power member connected to said connecting clutch element, a shiftable control means, a clutch for connecting said control means and shiftable friction clutch element whereby a connection is made at will between the train of meshed gears and the power member, and an electromagnet for controlling said clutch and means operable at a preset speed of the gear train for energizing said electromagnet.

11. In a device of the class described, the combination of a pair of gears permanently in mesh, an element of a friction clutch operatively connected to one of said gears to revolve therewith, a coacting clutch element adapted to be moved into engagement with the gear-connected-clutch-element to revolve therewith, a power member connected to said coacting clutch element, a shiftable control means, a clutch for connecting said control means and shiftable friction clutch element whereby a connection is made at will between the train of meshed gears and the power member, an electromagnet for controlling said clutch and a circuit closer actuated by said control means for closing the circuit through said electromagnet.

12. In a device of the class described, the combination with a pair of gears adapted to be shifted into a driving engagement, and a control means for varying the relative positions of said gears, of means for causing one of the gears to approach the speed of the other gear, said means including a friction clutch, a connection between the movable element of the clutch and said control means whereby the control means moves the clutch elements into driving engagement, said connection including an electromagnetically actuated clutch and means for actuating said clutch.

13. In a device of the class described, the combination with a pair of gears, one of which is adapted to be shifted into a driving engagement with the other and control means for effecting said shift, of means for causing one of the gears to revolve at a speed approximately that of the speed of the other gear before they are finally in driving engagement, said means including a friction clutch operatively connected to said control means to be moved into operative condition with the initial movement of said control means and electromagnetically actuated means for automatically disconnecting said friction clutch from the control means as the revolving gears approach a relatively fixed condition.

14. In a device of the class described, the combination with a pair of gears, one of which is adapted to be shifted into a driving engagement with the other and control means for effecting said shift, of means for causing one of the gears to revolve at a speed approximately that of the speed of the other gear before they are finally in driving engagement, said means including a friction clutch operatively connected to said control means to be moved into operative condition with the initial movement of said control means, a clutch for effecting the connection between the friction clutch and the control means, an electromagnet for controlling said clutch and means controlled by the control means for effecting the electro-magnetic condition of said electromagnet.

15. In a device of the class described, a friction clutch of the face type, means movable in one direction for moving the clutch elements into operative driving position and means controlled by a further movement of said clutch-element-moving-means beyond the position which causes a driving engagement of the clutch elements to release the driving engagement of the clutch elements.

16. In a device of the class described, the combination with a pair of gears one of which is adapted to be shifted into a driving engagement with the other and control means for effecting said shift, of means for causing one of the gears to revolve at a speed approximately that of the speed of the other gear before they are finally in driving engagement, said means including a friction clutch operatively connected to said control means to be moved into operative condition with the initial movement of said control means and means controlled by a continued movement of said control means for intercepting the connection between the control means and said friction clutch.

17. In a device of the class described, the combination with a power drive mechanism including a driving member and a member adapted to be driven thereby when in operative engagement therewith, of means including a differential gear set for causing the speed of one of the members to approach that of the other before they are engaged, a three place control means operatively connected to said power drive mechanism and to said means and in its movement from first to second place adapted to move the speed means from an inoperative into an operative position, and in its movement from second to third place adapted to release the speed means from its operative engagement with one member and simultaneously to move the members of the power drive mechanism into operative engagement.

18. In a device of the class described, the combination of a driving and a driven power member, means, including a driven member and a driving member rotatable at different speeds, for causing the speed of one of the power members to approach that of the other, a control means movable in one direction to effect an operative actuation of the driving and driven power members, said control means having two operative positions, means actuated by said control means when moved into its first position for moving said speed causing means into operative position and means operable by a continued movement of the control means past its position to cause the speed means to function and into its second position, for moving the power members into driving engagement.

19. In a device of the class described, the combination of a driving and a driven power member, means, including a driven member and a driving member rotatable at different speeds, for causing the speed of one of the power members to approach that of the other, a control means movable in one direction, means actuated by said control means for moving said speed causing means into operative position, means operable by a continued movement of the control means for moving the power members into driving engagement and means controlled by said continued movement of the control means for causing said speed means to become inoperative.

20. In a gear shifting device, the combination with a power member fixed against all movement except rotary movement, and a relatively movable power member adapted to be moved into driving engagement with the fixed power member, of change speed means distinct from the power members, but operatively connected therewith for causing one of the members to approach the speed of the other member, a control means attached directly to the movable power member to shift the same, a connection between said control means and said change speed means and means for breaking said connection.

21. In a gear shifting device, the combination of a power member fixed against all movement except rotary movement, a relatively movable power member adapted to be moved into driving engagement with the fixed power member, change speed means distinct from the power member but operatively connected therewith for causing one of the members to approach the speed of the other member, a control means attached directly to the movable power member to shift the same, a connection between said control means and said change speed means and means for breaking said connection, said connection including flexible means for permitting relative movement between said connection and said control means.

22. In a device of the class described, the combination of a pair of gears permanently in mesh, an element of a friction clutch operatively connected to one of said gears to revolve therewith, a coacting clutch element adapted to be moved into engagement with the gear - connected - clutch - element to revolve therewith, a power member connected to said coacting clutch element, a shiftable control means, and a clutch for connecting said control means and shiftable friction clutch element whereby a connection is made at will between the the train of meshed gears and the power member.

23. In a device of the class described, the combination of two pairs of gears, one pair permanently in mesh with the other pair adapted to be shifted relative to each other to and from a meshing position, an element of a friction clutch carried by one of the permanently meshed gears and a driving connection between the other of the permanently meshed gears and one of the relatively shiftable gears, the other of said relatively shiftable gears constituting a power member.

24. In a device of the class described, the combination of two pairs of gears, each pair of gears having approximately the same gear ratio, one pair permanently in mesh and the other pair adapted to be shifted relative to each other to and from a meshing position, an element of a friction clutch carried by one of the permanently meshed gears and a driving connection between the other of the permanently meshed gears and one of the relatively shiftable gears, the other of said relatively shiftable gears constituting a power member.

25. In a device of the class described, the combination of two pairs of gears, one pair permanently in mesh and the other pair adapted to be shifted relative to each other to and from a meshing position, an element of a friction clutch carried by one of the permanently meshed gears and a driving connection between the other of the permanently meshed gears and one of the relatively shiftable gears, the other of said relatively shiftable gears constituting a power member, a coacting clutch element adapted to engage said gear carried clutch element to form a driving connection therewith and a control means for shifting said coacting clutch element and for varying the relation of said shiftable pair of gears.

26. In a device of the class described, the combination of two pairs of gears, one pair permanently in mesh and the other pair adapted to be shifted relative to each other to and from a meshing position, an element of a friction clutch carried by one of the permanently meshed gears and a driving connection between the other of the permanently meshed gears and one of the relatively shiftable gears, the other of said relatively shiftable gears constituting a power member, a coacting clutch element adapted to engage said gear carried clutch element to form a driving connection therewith and means operable simultaneously with the meshing of the gears for causing said clutch element to become inoperative.

27. In a device of the class described, the combination of a shaft having two power gears and two closely positioned auxiliary gears fixed thereto, a second shaft having a gear thereon shiftable into meshing engagement with one of the power gears, a pair of closely positioned loosely mounted gears meshing with the pair of auxiliary gears, each of said loosely mounted gears provided with an element of a friction clutch, a single coacting clutch element movable into engagement with either of said gear-friction-clutch-elements, and a power member connected with said single clutch element.

28. In a device of the class described, the combination of a shaft having two power gears and two closely positioned auxiliary gears fixed thereto, a second shaft having a gear thereon shiftable into meshing engagement with one of the power gears, a pair of closely positioned loosely mounted gears meshing with the pair of auxiliary gears, each of said loosely mounted gears provided with an element of a friction clutch and a single coacting clutch element movable into engagement with either of said gear-friction-clutch-elements, a power member connected with said single clutch element and a control means for shifting said single clutch element.

29. In a device of the class described, the combination of a shaft having two power gears and two closely positioned auxiliary gears fixed thereto, a second shaft having a gear thereon shiftable into meshing engagement with one of the power gears, a pair of closely positioned loosely mounted gears meshing with the pair of auxiliary gears, each of said loosely mounted gears provided with an element of a friction clutch and a single coacting clutch element movable into engagement with either of said gear-friction-clutch-elements, a power member connected with said single clutch element, a control means for shifting said shiftable gear, means for shifting said single element and a resilient connection between said control means and said last named means, whereby the gear may be moved after the clutch element has been shifted.

30. In a device of the class described, the combination with a pair of power gears adapted to be meshed to form a driving gear train and a control means for shifting said gears, of means including a meshed gear train for causing one of the gears to attain the speed of the other, and an inaugurating mechanism for said means operatively connected to function through the actuation of said control means when the latter is moved to effect a meshing of the gears.

31. In a device of the class described, the combination with a pair of power gears adapted to be meshed to form a driving gear train and a control means for shifting said gears, of means for causing one of the gears to attain the speed of the other, inaugurating mechanism for said means operatively connected to function through the actuation of said control means when the latter is moved to effect a meshing of the gears and a resilient connection between said inaugurating mechanism and said control means.

32. In a device of the class described, the combination of a movable element of a friction clutch, a coacting element of the friction clutch constituting a means for limiting the movement of said movable element, a control rod, an electro-magnet provided with a plunger for engaging said movable element and a resilient connection between said control rod and said electro-magnet whereby a movement of the control rod is permitted after the movable element has engaged its coacting clutch element.

33. In a device of the class described, the combination of a movable element of a friction clutch, a coacting clutch element, a control rod, an electro-magnet provided with a plunger for engaging said movable element, a resilient connection between said control rod and said electro-magnet whereby a movement of the control rod is permitted after the movable element has engaged its coacting clutch element and power gears adapted to be shifted by said further movement of the control rod.

34. In a device of the class described, the combination of a movable element of a friction clutch, a coacting clutch element, a control rod, an electro-magnet provided with a plunger for engaging said movable element, a resilient connection between said control rod and said electro-magnet whereby a movement of the control rod is permitted after the movable element has engaged its coacting clutch element and a circuit breaker actuated by said further movement of the control rod.

35. In a device of the class described, a control rod provided with an extension constituting a plunger piston, a casing constituting the cylinder of said piston, a spring inclosed in said cylinder and bearing on said piston, to center the cylinder, a clutch carried by said casing, a shiftable friction clutch element adapted to be engaged by said clutch to shift the same by a movement of said control rod and a power gear shifter actuated from said control rod.

36. In a device of the class described, a control rod provided with an extension constituting a plunger piston, a casing constituting the cylinder of said piston, a spring inclosed in said cylinder and bearing on said piston, to center the cylinder, a clutch carried by said casing, an electro-magnet carried by said cylinder and operatively connected to said clutch to control the same, a shiftable friction clutch element adapted to be engaged by said clutch to shift the same by a movement of said control rod and a power gear shifter actuated from said control rod.

37. In a device of the class described, the combination of a friction clutch, a control rod for controlling said clutch, a connection between said control rod and said friction clutch including an electro-magnet of the impedance type carried by the rod and means controlled by the relative speed of the clutch elements for effecting the electric condition of said electro-magnet.

38. In a device of the class described, the combination of a driven and a driving member, one of which is shiftable to and from a driving engagement with the other member means for shifting said member, and electrically actuated mechanism operatively controlled by the relative speeds between the driving and driven members for causing said means to become inoperative.

39. In a device of the class described, the combination of a driven and a driving member, one of which is shiftable to and from a driving engagement with the other member, means for shifting said member, and electrically actuated mechanism including an electro-magnet of the impedance type operatively controlled by the relative speed between the driving and driven members for causing said means to become inoperative.

40. In a device of the class described, the combination of a shiftable member of a friction clutch, a control rod adapted to bear on said member to shift the same and means actuated by a continued movement of the control rod for intercepting the bearing connection between the rod and the shiftable clutch member.

41. In a device of the class described, the combination of a shiftable member of a friction clutch, a coacting clutch element constituting a means for limiting the movement of said member, a shift rod provided with an actuator adapted to engage said member to shift the same and means for intercepting the shifting engagement of said actuator with said member.

42. In a device of the class described, the combination of a shiftable member of a friction clutch, a coacting clutch member constituting a means for limiting the movement of said member, a shiftable stop on said member, a control rod adapted to engage said stop to shift said member and means carried by the control rod for moving the stop into an inoperative position and thus permit a further movement of the control rod.

43. In a device of the class described, the combination of a shiftable member of a friction clutch, a coacting clutch member constituting a means for limiting the movement of said member, a shiftable stop on said member, a control rod adapted to engage said stop to shift said member, means carried by the control rod for moving the stop into an inoperative position and thus permit a further movement of the control rod and a power gear shifting means actuated by said further movement of the control rod.

This specification signed this 11" day of May, 1917.

HOWARD J. MURRAY.

This specification signed this 25th day of May, 1917.

WALTER S. RUGG.